Sept. 29, 1964     C. O. GRAVES     3,150,940
BEARING SURFACE AND METHOD OF PRODUCING SAID SURFACE
Filed March 1, 1960     3 Sheets-Sheet 1
*Fig. 1*
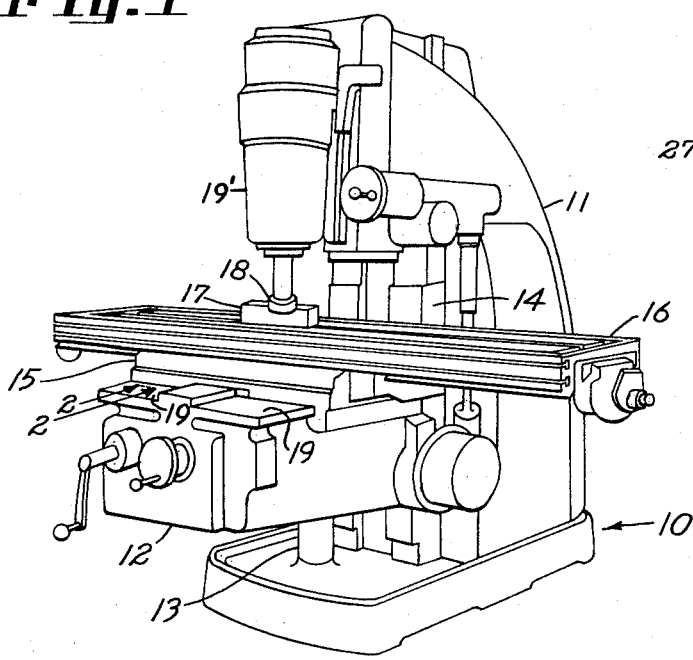
*Fig. 4*
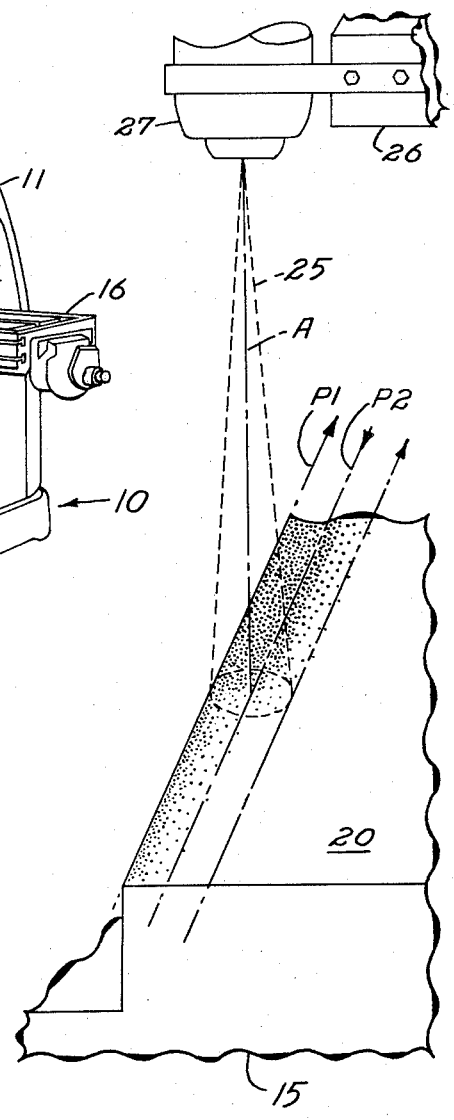
*Fig. 3*
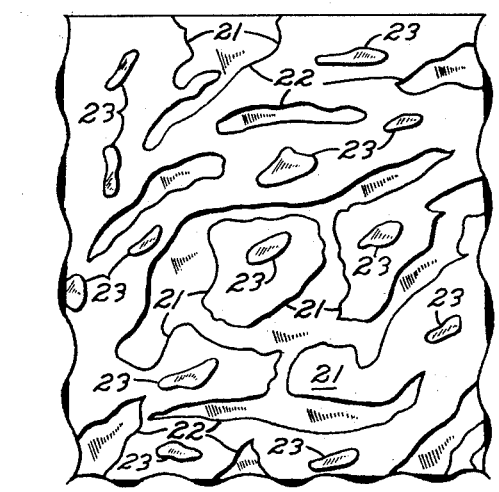
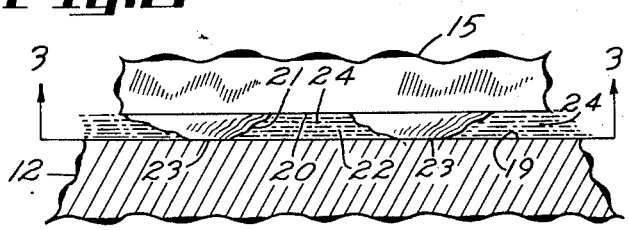
*Fig. 2*
INVENTOR.
CARL OSBORN GRAVES
BY
ATTORNEYS

United States Patent Office 3,150,940
Patented Sept. 29, 1964

3,150,940
BEARING SURFACE AND METHOD OF
PRODUCING SAID SURFACE
Carl Osborn Graves, Norwood, Ohio, assignor to The Cincinnati Milling Machine Co., Cincinnati, Ohio, a corporation of Ohio
Filed Mar. 1, 1960, Ser. No. 12,135
4 Claims. (Cl. 29—198)

The present invention relates to bearing members and the facing therefor, as well as the method of producing said facing, the facing being particularly suitable for flat slide surfaces in a machine tool.

Scoring is caused in a bearing surface when, because of an inadequate supply of oil, metal to metal contact is established between the bearing surface and the mating surface in sliding engagement therewith. As a result of this metal to metal contact, a particle of metal from the bearing surface may become welded to the mating surface and, when work hardened between the surfaces, will score the surface from which it was torn. In a machine tool, such as a milling machine, there is a marked tendency for scoring to occur on slide surfaces when short-stroked, rapid oscillations develop between the surfaces. For example, chatter, which may result when a heavy cut is taken at a slow cutting speed, can cause any slide supporting the workpiece to vibrate on its ways with strokes which, with conventional bearing surfaces, soon exhaust the oil from between the surfaces.

One method heretofore proposed to reduce scoring has been the machining of closely spaced grooves in one of the bearing surfaces to provide a continuous supply of oil to the lands between the grooves. Another method previously used, sometimes in conjunction with machined grooves in the surface, is the addition of a continuous lining or coating of a material less susceptible to scoring than the base material of the relatively moving members.

Although both of these methods are effective in reducing scoring they both add significantly to the cost of the bearing members. Moreover, when a coating is used, there is a tendency for the coating to peel, and, with many materials, it is difficult or impossible to assure a satisfactory bond between the base and the coating. When molten metal is sprayed on a bearing member to form a continuous coating there is danger of distortion of the bearing member as the coating shrinks during cooling. Generally, a continuous sprayed coating must be subsequently machined which adds to the cost of this type of bearing surface.

In the present invention there is provided a bearing surface, or face, combining many of the advantages of a machine grooved surface and a coated surface which is considerably less expensive than the surfaces heretofore used to reduce scoring. Although, in the present invention, a facing of good bearing material is used, significantly less of this material is required than in previous coated bearing surfaces. At the same time this material is bonded to the base in a manner to minimize any significant peeling. In addition, the pattern of the surface assures an adequate supply of oil at the load carrying portions of the bearing. This facing can be quickly and easily applied without extensive conditioning of the surface of the base and because of the pattern of the sprayed surface, there is a minimum tendency for distortion of the bearing member. Its ease of application makes it particularly suitable for extensive slide surfaces of a machine tool, and it can be readily applied after the slide members have been fitted in final assembly of the machine.

It is, therefore, one object of the present invention to provide an improved bearing surface having a reduced tendency to score.

It is another object of the present invention to provide an easily formed, inexpensive, bearing surface adapted to maintain a boundary film of oil at the load carrying portions of the surface.

It is yet another object of the present invention to provide a simple, inexpensive method of producing a bearing surface which effectively resists scoring.

It is a further object of the present invention to provide a method of applying a metal spray deposit having good bearing characteristics to a base surface in a pattern minimizing any tendency for distortion of the bearing member, or any tendency to peel.

It is still another object of the present invention to provide an effective method of producing a score resisting bearing surface on slide members of a machine tool without extensive surface conditioning or subsequent machining.

Other objects and advantages of the present invention should be readily apparent by reference to the following specification, considered in conjunction with the accompanying drawings forming a part thereof, and it is to be understood that any modifications may be made in the exact details there shown and described, within the scope of the appended claims, without departing from or exceeding the spirit of the invention.

In the drawings:

FIG. 1 is a view in perspective showing a milling machine having a saddle with a bearing surface formed in accordance with the present invention;

FIG. 2 is a greatly enlarged view taken on the line 2—2 of FIG. 1;

FIG. 3 is a view taken on the line 3—3 of FIG. 2;

FIG. 4 is a view showing application of the sprayed metal to the saddle of the machine of FIG. 1;

Figure 5:
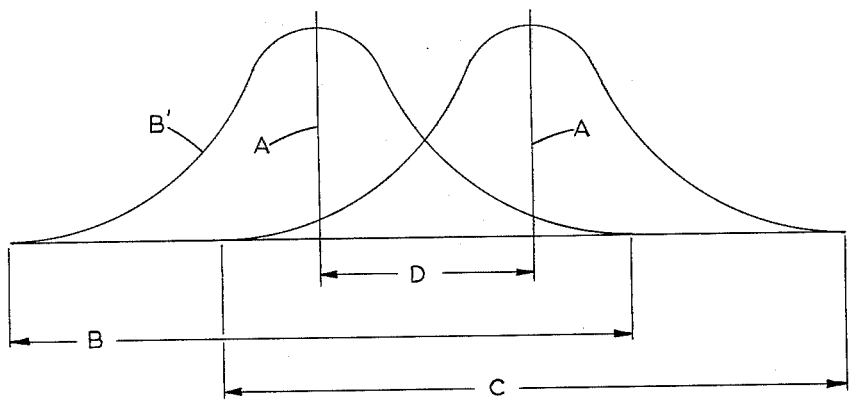
FIG. 5 is a chart showing the relative concentration of deposited metal about the axis of the spray cone for two successive passes of the spray gun.

There is shown in FIG. 1 a milling machine 10 having an upstanding column 11 and a knee portion 12 movable vertically by shaft 13 in guided engagement with ways 14 on the column. The knee portion 12 supports a saddle 15 on which is mounted a table 16 to which may be clamped a workpiece 17. The rotatable cutter 18 depends from a head 19 supported by column 11 and extending over the table. The saddle 15 is movable towards and away from column 11 on knee portion 12, and the table 16 is movable longitudinally on saddle 15 whereby these members define slide or bearing members having relatively moving slide or bearing surfaces. Chatter resulting from the machining operation may cause rapid, short-stroked oscillations of saddle 15 on knee portion 12.

Figure 6:
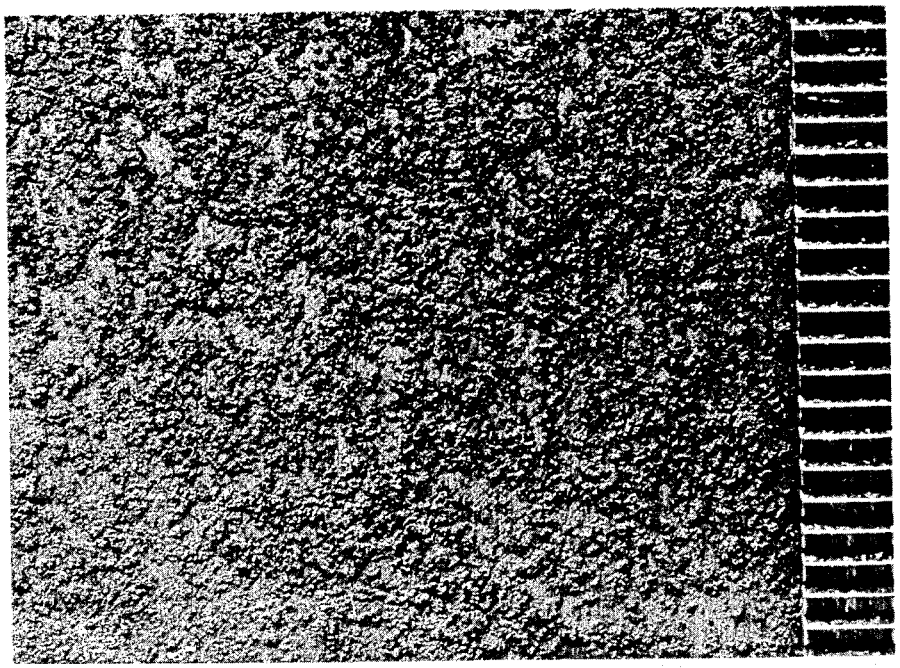
FIG. 6 is a photomicrograph, in plan, of the sprayed metal on the base surface, the markings along the right hand margin being spaced 1/64 of an inch apart.
Figure 7:
FIG. 7 is a photomicrograph, enlarged 16⅔ times the enlargement of FIG. 6, in cross section, showing molybdenum deposited on a cast iron base in an interrupted pattern, the dark plastic material over the molybdenum being a conventional mounting material used for photographic purposes only.

The mating slide surfaces 19 and 20 of the knee portion 12 and saddle 15, respectively, are shown in FIG. 2. One of the surfaces, 20, has a random distribution of a good bearing material, such as molybdenum, bonded thereto in an interrupted pattern as shown best in FIGS. 3 and 6. The molybdenum, indicated at 21, is interrupted by irregular gaps 22, as shown best in FIGS. 2 and 7, where the base surface 20 is exposed. The bearing material 21 terminates in a plurality of lands, or flats, 23, all lying substantially the same distance from the base surface 20, to receive the mating surface 19. The gaps 22 hold a supply of oil, indicated at 24, adjacent the flats so that a boundary film of oil may be maintained between the flats 23 and surface 19.

The above-described bearing face can be formed quickly, easily, and inexpensively by propelling a nonsaturating spray of molten metal onto the base surface to form an interrupted pattern of deposited metal thereon. Among the metals which can be bonded to a metal base surface, such as the surface 20, which is cast iron, the most satisfactory for the present invention is molybdenum. As described in U.S. Patent 2,588,421, molybdenum, in substantially pure form or an alloy or composition thereof as described in said patent, can be bonded satisfactorily to the metal base surface without extensive conditioning of the base surface. In addition to its good bonding characteristics, this metal is exceptionally suited because of its excellent resistance to wear. For the bonding of molybdenum it is only necessary that the surface be clean, and generally a satisfactory conditioning of the surface can be accomplished with solvents or alkalies. Molybdenum deposited in an interrupted pattern will readily adhere to a flat cast iron surface which has been scraped and cleaned. Although a satisfactory bond of an interrupted molybdenum deposit to a cast iron base surface can be obtained without more extensive conditioning of the surface, a more tenacious bond will be achieved if the base surface is roughened as by grit blasting.

The application of the molybdenum in the interrupted pattern of the present invention can be done with a conventional spray gun, adjusted and set in the same manner recommended for spraying a conventional coating on a surface. These guns have means to heat the metal to be applied and means to propel the metal in the form of a spray toward the base surface to be faced. In one type of gun, for example, the metal in the form of a wire is fed into the gun where it is melted, and the molten metal is propelled from the gun by a jet of air. In the present invention, the gun is passed over the surface, in spaced relation thereto, at a steady rate, fast enough to avoid saturation of the surface with the deposited metal. The gun may be passed over the area to be sprayed more than once, but it is essential that, after the spraying is completed, the base surface, such as 20, be unsaturated, or, in other words, that gaps, as indicated at 22 in FIGS. 2 and 3, remain, which leave portions of the base surface 20 exposed.

It is sometimes difficult, during spraying, to distinguish between the sprayed deposit 21 and the exposed base surface 20, and therefore care must be taken that the spraying be terminated before the gaps 22 are filled in with the sprayed metal. If the base surface is machined, or scraped, or relatively regular compared to the irregular spray deposits, the operator can position himself, relative to the base surface to be sprayed, opposite a light source which reflects off the regular surface. As he sprays, the light striking the irregularly shaped metal deposited on the surface will be diffused, offering a visible contrast between the sprayed metal and the exposed regular base surface which reflects the light. In this manner, there is assurance the spraying can be stopped before the surface is saturated. Even without this technique, however, it is not difficult, after some experience, to judge when the spraying should be terminated to avoid complete saturation of the surface.

Figure 8:
FIG. 8 is a view similar to the view of FIG. 7 showing a flat honed on the molybdenum deposit.

After the metal has been deposited on the surface, the peaks of the deposited metal are removed to form the flats or lands 23, shown in FIGS. 2, 3, and 8, which support the load. Although sprayed molybdenum is very difficult to machine, the spaced peaks can be readily removed with a light honing. A cast iron bar or plate, coated with aluminum oxide and ground with a diamond wheel, will effectively remove the peaks.

A typical bearing surface constructed in accordance with the present invention may have 75 percent of the base surface, such as the surface 20, covered with molybdenum. The load supporting faces, or flats, 23 may, for example, be raised from the base surface 20 between one-thousandth and two-thousandths of an inch, and the area of the flats may be on the order of 10 percent of the area covered by the molybdenum. The size of the flats, in a typical surface, may vary considerably, the large majority of the flats being in the range of between two-thousandths and twenty-thousandths of an inch across. In a square inch of surface there may, for example, be 200 distinct, spaced, load bearing flats.

It is believed that the molten metal is propelled from the gun in discrete particles ranging from a few microns to approximately two-thousandths of an inch in diameter. Since the particles flatten when they strike the base surface, it would be expected that the base surface would be covered by a continuous, substantially level, deposit of metal before any portion of the surface built up to even one-thousandth of an inch. However, it has been found that a great number of the peaks (which are honed down to produce the flats 23) exceed two-thousandths of an inch, with many exceeding three-thousandths of an inch, before saturation of the surface occurs. It is not known whether this is because of the random distribution of the small particles, which results in a stacking of many particles while portions of the base surface remain exposed, or whether many discrete particles become joined in some manner before or when they strike the surface.

It is desirable that the metal be deposited evenly over the entire base surface to be faced so that the load of one of the slide members, such as the saddle 15, will be evenly distributed on the mating surface 19 thereof. This requires that, in application of the metal deposit, the gun be moved over the surface at a steady rate, rapidly enough to avoid saturation of the base surface with the deposited metal. The molten metal is discharged from the gun in a conical dispersion, as shown at 25 in FIG. 4, and, unless the area to be faced is quite narrow, it is necessary to make a series of laterally spaced passes to properly cover the base surface. The concentration of metal in the cone is greatest at the axis A of the cone and diminishes as the distance from the axis increases so that, on each pass, the metal is distributed on the base surface in a band having a relatively heavy concentration of metal in the center and a lighter concentration thereof along the edges, as indicated by curve B' in FIG. 5, which curve shows the concentration of the metal relative to the axis A of the cone. In order to keep the distribution of the metal as even as possible, it is desirable that the bands of metal laid down on successive passes, which are laterally spaced relative to each other a distance D, overlap so that the relatively thin concentration of metal laid down at the edge of one band, such as band B in FIG. 5, is suplemented by the corresponding edge concentration of the band C of metal laid down on the succeeding pass, thereby giving a total concentration at the edges of the respective bands approximating the concentration at the center of the band on and near the axis A of the dispersion cone. The use of a power operated constant speed carriage, laterally shiftable in discrete predetermined increments, indicated at 26 in FIG. 4, will facilitate prodcing an even concentration of the interrupted metallic deposit.

By way of example, in a particular application of the present invention, the saddle 15 of the machine tool is fitted to the knee 12 thereof in the conventional manner at final assembly of the machine, the flat slide surfaces of the respective members being scraped to remove the high spots therefrom until flat, mating, surfaces are produced. The surface 20, at this time, may be, for example, two-thousandths of an inch below the desired level of the finished bearing face. The saddle is then removed from the machine and mounted on a table (not shown), with surface 20 up, and a spray gun 27 is mounted on carriage 26 for movement longitudinally relative to surface 20, said carriage being selectively shiftable laterally relative to the direction of travel. A satisfactory bearing face can be applied with a Type 4E Metco gun with a type J air cap manufactured by the Metallizing Engineering Co., Inc. of Westbury, New York, using an 11 gage wire known as "Spraybond," produced by the same company, which is a substantially pure molybdenum. In this gun, the wire is fed into a heating zone in the gun where the combustion of oxygen and acetylene (each supplied at a rate of 32 cubic feet per minute during spraying in this particular application) melt the wire. A jet of air (at 50 p.s.i.), concentric relative to the heating zone, propels the molten metal through the air cap. The wire is melted as it is fed into the flame, and the wire feed rate is adjusted to maintain about three quarters of an inch of the wire protruding beyond the air cap.

After the surface has been cleaned with a solvent, or grit blasted for cleaning and slight roughening, the gun is moved over the surface at a height of about 7 inches and at a rate of about 55 feet per minute, the axis A of the dispersion cone following a path P1 along the edge of the portion being faced and moving in a direction indicated by the arrow. After the spray cone 25 has moved beyond the far edge of the surface to be faced, the carriage is shifted laterally 5/8 of an inch (corresponding to the distance D between centers of the dispersion cone axis for succeeding passes in FIG. 5) and reversed to move along the path P2 in the direction of the arrow thereon. Successive overlapping passes, spaced 5/8 of an inch apart are made until the full width of the surface has been spanned. For honing, a cast iron block, corresponding to the mating surface and about 2½ to 3 inches thick, having an aluminum oxide coating, is reciprocated over the faced surface until the flats 23 are two thousandths of an inch above the base surface 20.

The surface thus described provides an ample supply of oil all about each of the load supporting flats 23, which oil supply can maintain a boundary film of oil between said flats and the mating surface 19, even when there is short rapid oscillation between the bearing members. Any grit which may fall on any of the lands will immediately be swept into one of the gaps 22 which are distributed throughout the surface. A good wear resistant surface has thus been provided to receive the load and the interrupted metallic deposit has a minimum tendency to peel. If there is separation of one fragment of the metallic deposit from the base surface, it will not, because of the interrupted pattern of the surface, cause separation of the entire deposited surface, which would tend to occur if the deposited facing were continuous, but, instead, said one fragment will, if not completely isolated from adjoining fragments, break loose from said adjoining fragments without affecting their adhesion to the base surface. Because of the interrupted pattern of the sprayed deposit on the surface 20, the force applied to the bearing member at this surface caused by shrinkage of the metallic deposit as it cools, will not be continuous across the entire surface but, instead, will consist only of minute, localized forces which will have much less tendency to bend, or distort, the bearing member than a continuous force. At the same time, the surface can be applied more quickly and with considerably less facing material than a continuous coating would require.

What is claimed is:

1. A bearing member comprising a base having an uninterrupted surface and a deposit of molybdenum on said surface bonded thereto in a random interrupted pattern to leave gaps exposing the base.

2. A bearing member comprising a metallic base having a flat surface and a deposit of molybdenum bonded to the surface of said base in a random interrupted pattern to leave gaps exposing the base, said molybdenum deposit having flats formed thereon.

3. A bearing member comprising a ferrous base having a flat surface and a molybdenum deposit bonded to said surface in a random interrupted pattern to leave irregular gaps exposing the base, said deposit having spaced flats of equal height above said surface formed thereon.

4. A machine tool slide member comprising a cast iron base portion having a flat surface and a deposit of molybdenum bonded to said surface in a random interrupted pattern to leave irregular gaps exposing the base, said deposit having a plurality of spaced flats distributed over said surface of equal height above said surface to receive a mating slide surface.

References Cited in the file of this patent

UNITED STATES PATENTS

| | | |
|---|---|---|
| Re. 21,495 | Short | June 25, 1940 |
| 192,167 | Huguenin | June 19, 1877 |
| 268,469 | Edge | Dec. 5, 1882 |
| 1,605,082 | Trist | Nov. 2, 1926 |
| 2,070,892 | Gamble | Feb. 16, 1937 |
| 2,144,250 | Allen | Jan. 17, 1939 |
| 2,149,657 | Armstrong | Mar. 7, 1939 |
| 2,309,018 | Shaw | Jan. 19, 1943 |
| 2,375,154 | Volterra | May 1, 1945 |
| 2,480,711 | Calton | Aug. 30, 1949 |
| 2,685,124 | Toulmin | Aug. 3, 1954 |
| 2,793,427 | Marvin | May 28, 1957 |
| 3,004,333 | Schaefer | Oct. 17, 1961 |